United States Patent [19]

Abe

[11] 4,120,627

[45] Oct. 17, 1978

[54] APPARATUS FOR MAKING BALL-SHAPED MARSHMALLOW PRODUCTS

[75] Inventor: Minoru Abe, Zama, Japan

[73] Assignee: Eiwa Confectionary Co., Fuchu, Japan

[21] Appl. No.: 778,289

[22] Filed: Mar. 16, 1977

[51] Int. Cl.² ............................................. A23G 3/00
[52] U.S. Cl. ..................................... 425/92; 425/101; 425/217; 425/294
[58] Field of Search ............... 425/294, 313, 101, 102, 425/224, 217, 308, 371, 131.1, 90, 92

[56] References Cited

U.S. PATENT DOCUMENTS

| | | | |
|---|---|---|---|
| 771,560 | 10/1904 | Meurell | 425/224 X |
| 1,140,704 | 5/1915 | Norton | 425/217 X |
| 1,169,602 | 1/1916 | Bausman | 425/217 X |
| 1,192,156 | 7/1916 | Bainbridge | 425/101 |
| 1,753,834 | 4/1930 | Ponisch | 425/294 |
| 1,958,808 | 5/1934 | Zehender | 425/101 X |
| 2,035,188 | 3/1936 | Quick | 425/371 X |
| 3,213,808 | 10/1965 | Schafer | 425/131.1 X |
| 3,648,596 | 3/1972 | Zito | 425/217 X |
| 3,672,803 | 6/1972 | Rees | 425/217 X |

FOREIGN PATENT DOCUMENTS 1,591,551 6/1970 France ...................................... 425/205

*Primary Examiner*—Francis S. Husar
*Assistant Examiner*—William R. Briggs
*Attorney, Agent, or Firm*—Sughrue, Rothwell, Mion, Zinn and Macpeak

[57] ABSTRACT

An extruded string of marshmallow material is powdered and conveyed to a pair of scallop surfaced cutter drums which are synchronously rotated in opposite directions and simultaneously axially reciprocated relative to each other, whereby the string is pinch or squeeze severed into individual marshmallows. A rounded form is implemented by each marshmallow being rolled in the tube formed by a pair of facing scallop grooves of the reciprocating drums during its temporary presence therein. If a filler of jam or the like is extruded within the string, the pinch severing tends to sealingly force the relatively viscous marshmallow material over the ends of the filler pocket to thereby prevent the escape and leakage of the filler.

9 Claims, 6 Drawing Figures

APPARATUS FOR MAKING BALL-SHAPED MARSHMALLOW PRODUCTS

BACKGROUND OF THE INVENTION

1. Filed of the Invention

This invention relates to an apparatus for making ball-shaped marshmallow products.

2. Description of the Prior Art

Individual marshmallows are typically made by forming a marshmallow string and then cutting it into predetermined lengths with a planar, reciprocating cutter, whereby the resultant products have a generally squared or rectangular configuration. Further, when the marshmallows contain a filler material, such as jam, jelly, etc., such filler is liable to become exposed and leak out. The reciprocating operation of the conventional cutter also makes it difficult to achieve high speed operation without causing machine problems, whereby the production rates are generally relatively low.

SUMMARY OF THE INVENTION

It is therefore an object of the present invention to provide an improved marshmallow producing apparatus which eliminates the above defects. According to the invention, a roll cutter comprising a pair of rotary cutter drums having scalloped surfaces is used instead of a conventional reciprocating cutter, whereby an elongated marshmallow string extrusion is smoothly and easily cut into predetermined lengths with each individual marshmallow having a rounded or ball-shape. The cutter drums implement a form of squeeze or pinch cutting, whereby any filler material such as jam or jelly is effectively sealed in at the cut ends to thus prevent exposure and leakage. The rounded effect is also implemented by providing reciprocal axial movement between the two cutter drums, whereby each marshmallow is rolled during its temporary presence between facing scallop grooves of the drums.

DETAILED DESCRIPTION OF THE PREFERRED EMBODIMENT

Figure 1:
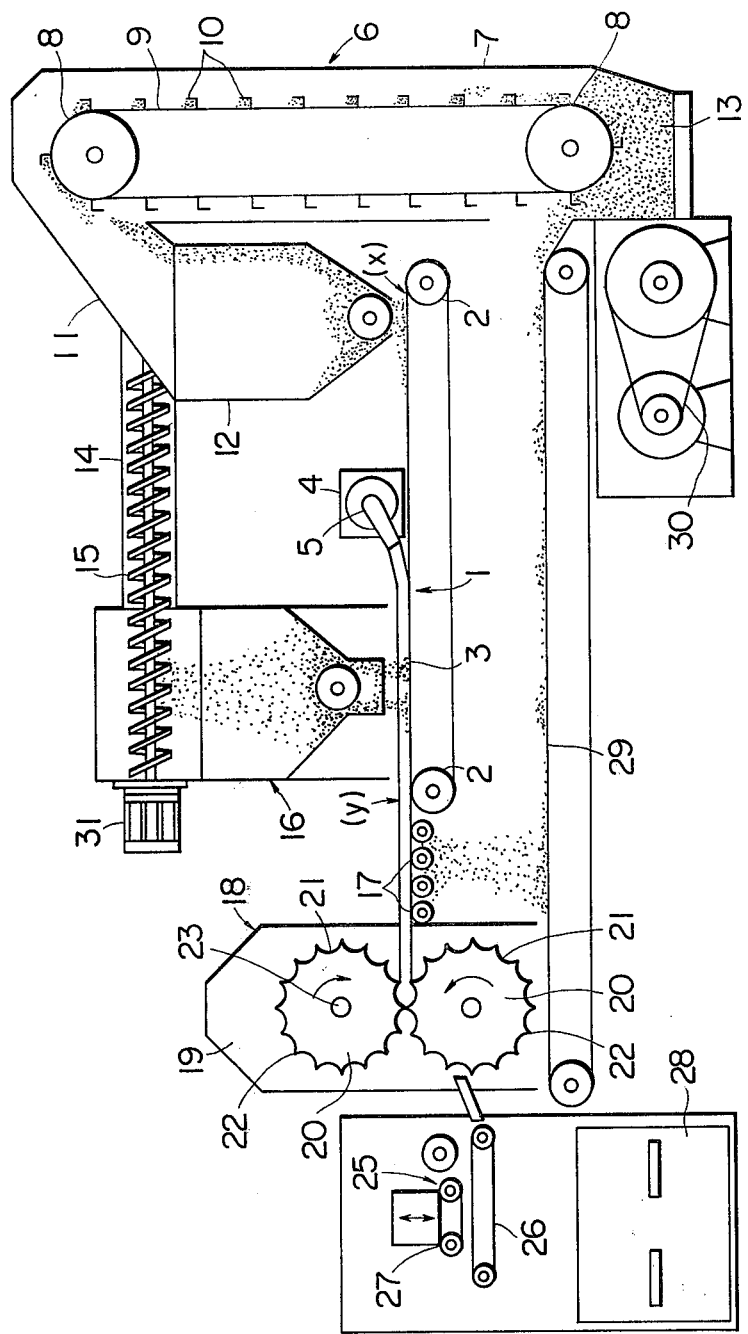
FIG. 1 shows a schematic side view of an apparatus for manufacturing ball-shaped marshmallow products according to this invention.

Referring now to FIG. 1, reference numeral 1 designates a conveyor for feeding an extruded string of marshmallow. The conveyor comprises an endless belt 3 and a pair of spaced rollers 2, 2. An extruder 4 is disposed above the upper surface of the conveyor belt 3, and includes an extrusion nozzle 5 for continuously supplying a string or rod of marshmallow material.

Figure 4:
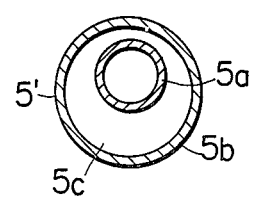
FIG. 4 shows a sectional view of a double tube extrusion nozzle used in the invention.

To produce a marshmallow containing a filler such as jam or jelly a double tube nozzle 5' must be used, as shown in FIG. 4. The double tube nozzle 5' is constructed so that an inner tube 5a is eccentrically disposed within an outer tube 5b. The space 5c between the tubes supplies a marshmallow covering material a, whereby extrusions of the filler material b from the tube 5a and the covering material a from the space 5c are simultaneously carried out.

Figure 2:
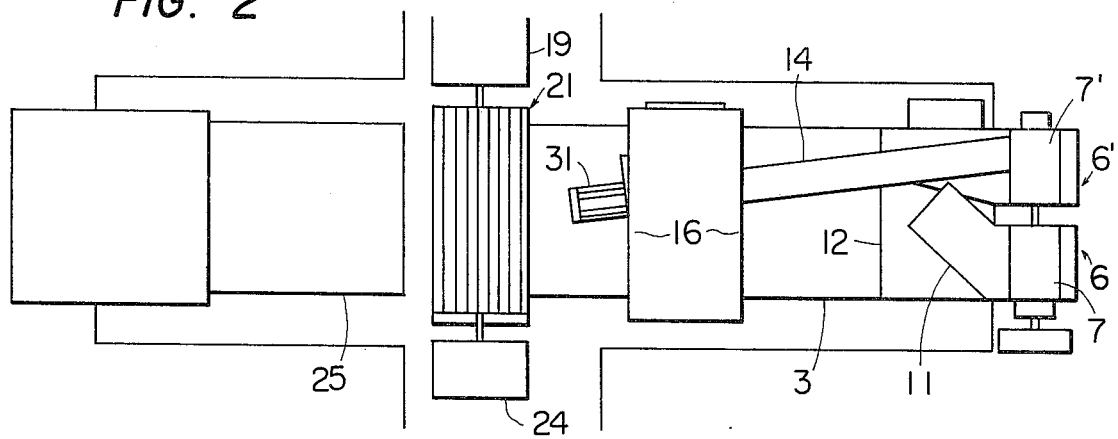
FIG. 2 shows a plan view of FIG. 1.
Figure 3:
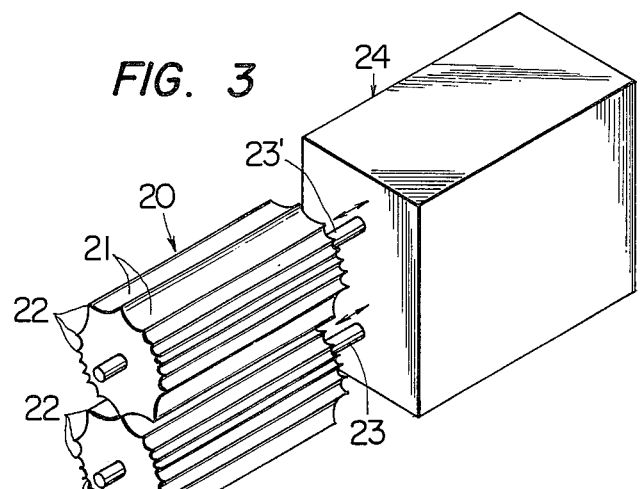
FIG. 3 shows a perspective view of the cutter drums used in the invention.

A pair of powder supply means 6, 6' are disposed adjacent each other on the feed side (x) of the conveyor 1, as shown in FIG. 2. These powder supply means are constructed so that an endless belt 9 is perpendicularly arranged on a pair of rollers 8, 8 disposed in a housing 7, and a plurality of scoop buckets 10 are mounted on the outer periphery of the belt 9 at spaced intervals. The belt 9 is driven through the rollers 8 by a motor or the like, schematically shown at 30. In the powder supply means 6, the internal portion of the upper side of the housing 7 is connected through a chute 11 to a first powder spreading hopper 12 disposed above the conveyor 1 on the feed side (x) thereof. Powder 13 gathered in the bottom of the housing 7 is fed into the first hopper 12 through the chute 11 after it is scooped up by the buckets 10, and is thereafter spread out on the upper surface of the conveyor belt 3. The powder 13 may be confectioners sugar or the like, whose primary purpose is to prevent the individual marshmallows from sticking together. The other powder supply means 6' is connected through a screw conveyor 14 to a second hopper 16 disposed above the discharge side (y) of the conveyor. The conveyor 14 comprises an enclosed feed screw 15 driven by a motor 31. The powder 13 supplied to the screw conveyor 14 is delivered thereby into the second hopper 16, whereafter it is spread out on the upper surface of the conveyor belt 3. A plurality of rotatable guide rollers 17 are horizontally disposed adjacent the discharge end (y) of the conveyor 1, and a roll cutter 18 is positioned just after the guide rollers 17. The roll cutter 18 comprises a pair of cutter drums 20, 20 rotatably journaled on side walls 19 one above the other.

The cutter drums 20, 20 have a plurality of wavy scallop grooves 21 on their peripheral surface, which are cut out in parallel in the axial direction. The projecting edges 22 between adjacent grooves constitute sharp cutting edges. The surface of each cutter drum is coated with a layer of teflon to prevent the marshmallow material A from adhering thereto. The grooves 21 and the cutting edges 22 on the upper and lower drums are disposed to face each other. Both cutter drums are synchrounously rotated in opposite directions, and are also reciprocatingly movable in the axial direction by a drive mechanism 24 (known per se) whereby one shaft 23 is relatively axially movable in a back and forth manner with respect to the other shaft 23'. The mechanism 24 may, for example, comprise a rotationally driven crank shaft having a link arm pivotally coupled between the offset portion of the crank shaft and a drum shaft 23 or 23', much in the same manner as the piston rod/crank shaft arrangement in an internal combustion engine. A pressing and transferring means 25 is disposed on the discharge side of the roll cutter 18, and comprises a lower conveyer belt 26 and an upper pressing belt 27 adapted to move up-and-down to slightly flatten the marshmallows. A container 28 for the final products is disposed beneath the conveyor belt 26. Reference numeral 29 designates a powder collecting belt for recovering the powder 13 fallen from the conveyor 1, the guide rollers 17, and the roll cutter 18, and delivering it back to the powder supply means 6, 6'. The motor 30 drives the powder conveyor 1, the powder supply means 6, 6', and the conveyor belt 29.

Figure 5:
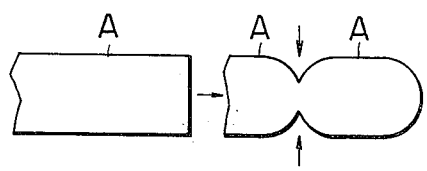
FIG. 5 shows a sectional view illustrating the cutting of a marshmallow extrusion.
Figure 6:
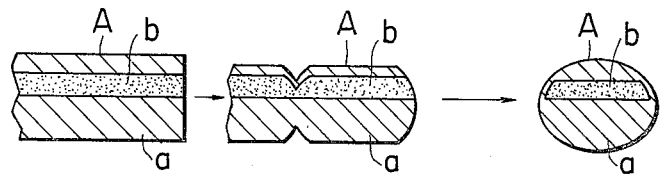
FIG. 6 shows a sectional view illustrating the cutting of a filler containing marshmallow extrusion.

In operation, the conveyor 1, the powder supply means 6, 6', the roll cutter 18, the compressive transfer means 25, and the powder collecting conveyor belt 29 are first driven or started up so that the powder 13 is spread out from the hoppers 12, 16 onto the moving conveyor belt 3. The extruder 4 is then turned on to deliver a string of marshmallow A, either in solid form from a single nozzle or containing a filler material b from a double nozzle, onto the powdered conveyer belt 3, over the guide rollers 17, and into the roll cutter 18. During the transfer from the belt 3 to the cutter 18, the powder 13 spread over the belt prevents the marshmallow string A from adhering thereto. When the string passes under the second hopper 16 additional powder 13 is dispensed over the upper and side surfaces of the string, whereby it does not adhere to the cutter drums 20, 20. The roll cutter 18, whose drums 20, 20 are rotating in opposite directions while reciprocatingly moving along their axes relative to each other, thus separate and shape the string into individual, rounded marshmallow products, as shown in FIGS. 5 and 6. Any filler material (b) is covered at its severed ends with the marshmallow material (a), as shown in FIG. 6, whereby the filler does not leak out even when the marshmallow material is pressed by the cutting edges 22, 22. The eccentric or center-displaced positioning of the filler material (b) enables and enhances this end sealing effect, together with the pinch or squeeze cutting implemented by the scalloped cutter drum surfaces. Since the covering material (a) is somewhat viscous, it is depressed toward the center of the string during cutting, whereby the filler material is not exposed in the final product. Moreover, during the cutting operation the marshmallows are temporarily positioned between a pair of cutter grooves 21, 21, and by reason of the reciprocal axial movement of the drums 20, 20 each marshmallow is rolled between the facing grooves to thus form a ball-shaped product. The severed and formed products are then fed to the conveyor 26 by the continued rotation of the lower cutting drum 20, whereat the ball-shaped marshmallows are slightly flattened by the belt 27 during its up-and-down motion and then drop into the container 28.

In the above description the covering material and filler are extruded such that the latter is displaced from the center axis of the former, but the present invention is not necessarily limited to such a feature. Further, only one cutting drum 20 has to be axially reciprocated in order to effect the necessary relative movement between the two drums.

I claim:

1. An apparatus for making a ball-shaped marshmallow product, comprising:
    (a) a tubular extruder for forming a string of marshmallow,
    (b) a conveyor belt disposed below a nozzle of the extruder for transporting said string of marshmallow,
    (c) first and second powder supply means arranged adjacent each other proximate an inlet end of said conveyor belt,
    (d) first and second feed hoppers respectively connected to said powder supply means, the former being disposed above the conveyor belt and upstream from the extrusion nozzle and the latter being disposed above the conveyor belt and downstream from said nozzle,
    (e) a roll cutter disposed proximate the discharge end of said conveyor for cutting the powdered string of marshmallow at spaced intervals and forming each cut portion into a ball-shaped product,
    (f) a drive source coupled to said conveyor, said powder supply means, and said roll cutter, and
    (g) pressing and transferring means transferring each cut portion from the roll cutter to a container while simultaneously flat pressing each cut portion,
    (h) said second powder supply means including an endless belt vertically disposed on a pair of rollers journalled above the other in a housing, and a plurality of bucket scoops mounted on the outer periphery of said belt, said second supply means being connected to said second hopper by a powder feed cylinder.

2. An apparatus as claimed in claim 1, wherein said extrusion nozzle comprises a single tube.

3. An apparatus as claimed in claim 1, wherein said extrusion nozzle comprises an inner tube eccentrically disposed within a surrounding outer tube.

4. An apparatus as claimed in claim 1, wherein said roll cutter comprises a pair of rotary cutting drums.

5. An apparatus as claimed in claim 4, wherein the peripheral surface of each cutting drum has a plurality of parallel, scalloped grooves in the axial direction and a plurality of cutting edges each defined by an upstanding radial portion between adjacent grooves.

6. An apparatus as claimed in claim 1, wherein said first powder supply means includes an endless belt vertically disposed on a pair of rollers journalled one above the other in a housing, and a plurality of bucket scoops mounted on the outer periphery of said belt, said first supply means being connected to said first hopper by a powder chute.

7. An apparatus as claimed in claim 1, wherein said powder feed cylinder comprises a cylindrical housing and a screw conveyor internally and rotatably mounted therein, said screw conveyor being coupled to a drive source.

8. An apparatus as claimed in claim 1, wherein said pressing and transferring means comprises a pair of conveyor belts disposed one above the other, and means vertically reciprocating the upper conveyor belt to thereby vary the spacing between the pair of belts.

9. An apparatus as claimed in claim 5, wherein said drums are synchronously rotated in opposite directions such that the grooves and edges of the two drums come into respective alignment with each other during rotation, and further comprising means implementing relative, axial, reciprocating movement between the two drums simultaneously with the rotation thereof.

* * * * *